United States Patent [19]

Hufnagl et al.

[11] 4,221,041
[45] Sep. 9, 1980

[54] SEMI-TUBULAR RIVETS AND METHOD OF USING

[75] Inventors: Gerhart Hufnagl, Seattle; Clark R. Zehnder, Renton, both of Wash.

[73] Assignee: Boeing Commercial Airplane Company, Seattle, Wash.

[21] Appl. No.: 948,075

[22] Filed: Oct. 2, 1978

[51] Int. Cl.³ .................... B21D 39/00; B23P 11/00
[52] U.S. Cl. ................... 29/512; 29/522 A; 29/526 A; 85/37; 403/274
[58] Field of Search ............... 29/512, 522 R, 522 A, 29/523, 526 A; 85/37; 403/274; 156/91

[56] References Cited

U.S. PATENT DOCUMENTS

| 2,289,221 | 7/1942 | Sorensen | 85/37 |
| 2,724,614 | 4/1973 | Bender | 85/37 X |
| 2,993,673 | 7/1961 | Villar | 29/512 UX |
| 3,767,018 | 10/1973 | Gordon | 85/37 X |
| 3,921,777 | 11/1975 | Rist | 85/37 |
| 4,007,540 | 2/1977 | Tyree | 85/37 |
| 4,022,310 | 5/1977 | Gennes | 156/91 X |
| 4,146,118 | 3/1979 | Zanki | 85/37 X |

FOREIGN PATENT DOCUMENTS

| 78019 | 5/1955 | Netherlands | 85/37 |
| 687574 | 2/1953 | United Kingdom | 85/37 |

*Primary Examiner*—Charlie T. Moon
*Attorney, Agent, or Firm*—Morris A. Case; Bernard A. Donahue

[57] ABSTRACT

A rivet for joining fiber reinforced plastic laminates has an alloy of titanium columbium. The rivet is semi-tubular in shape. The tubular portion is shaped with an outwardly tapered inner wall to provide for expansion of the tubular section without expanding the balance of the shank.

5 Claims, 4 Drawing Figures

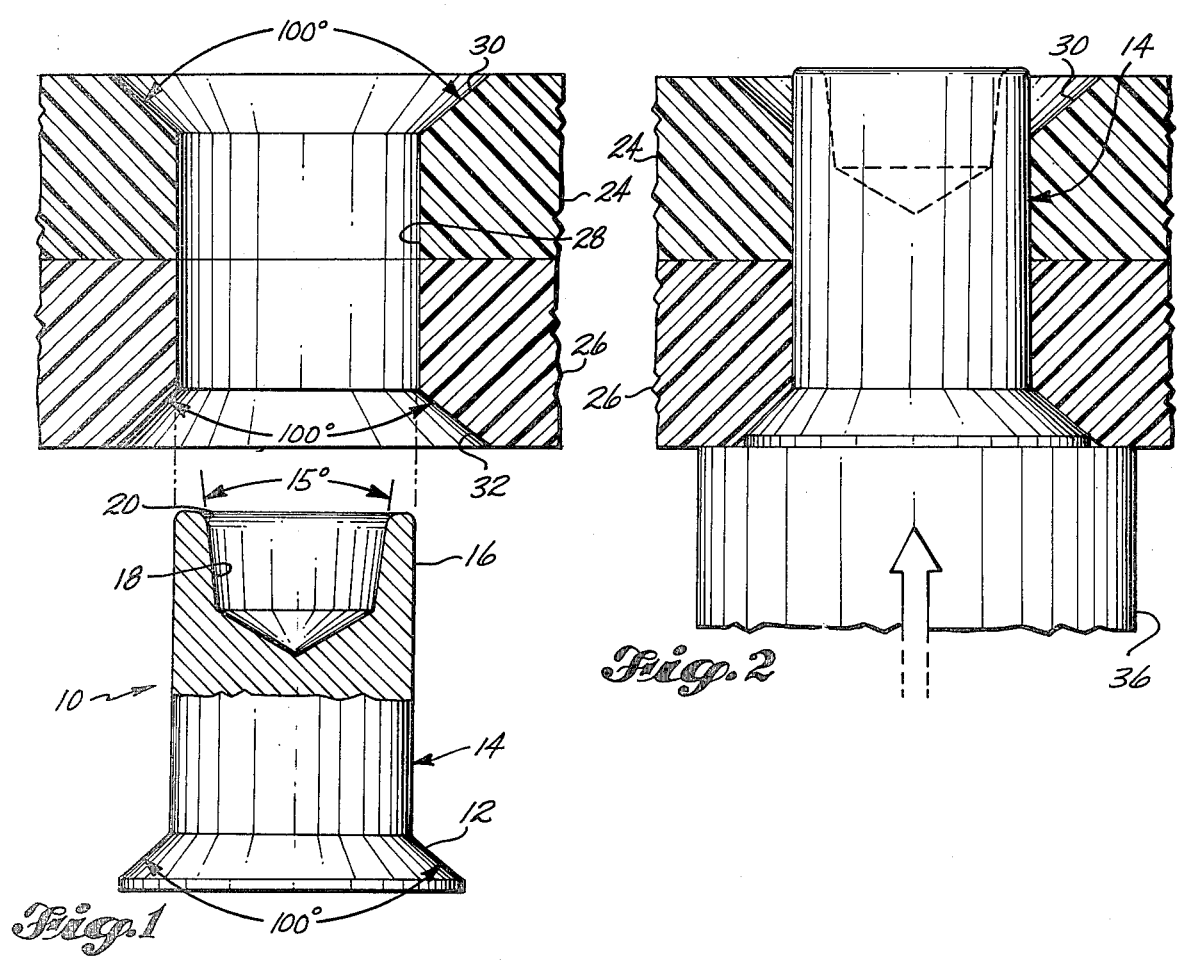
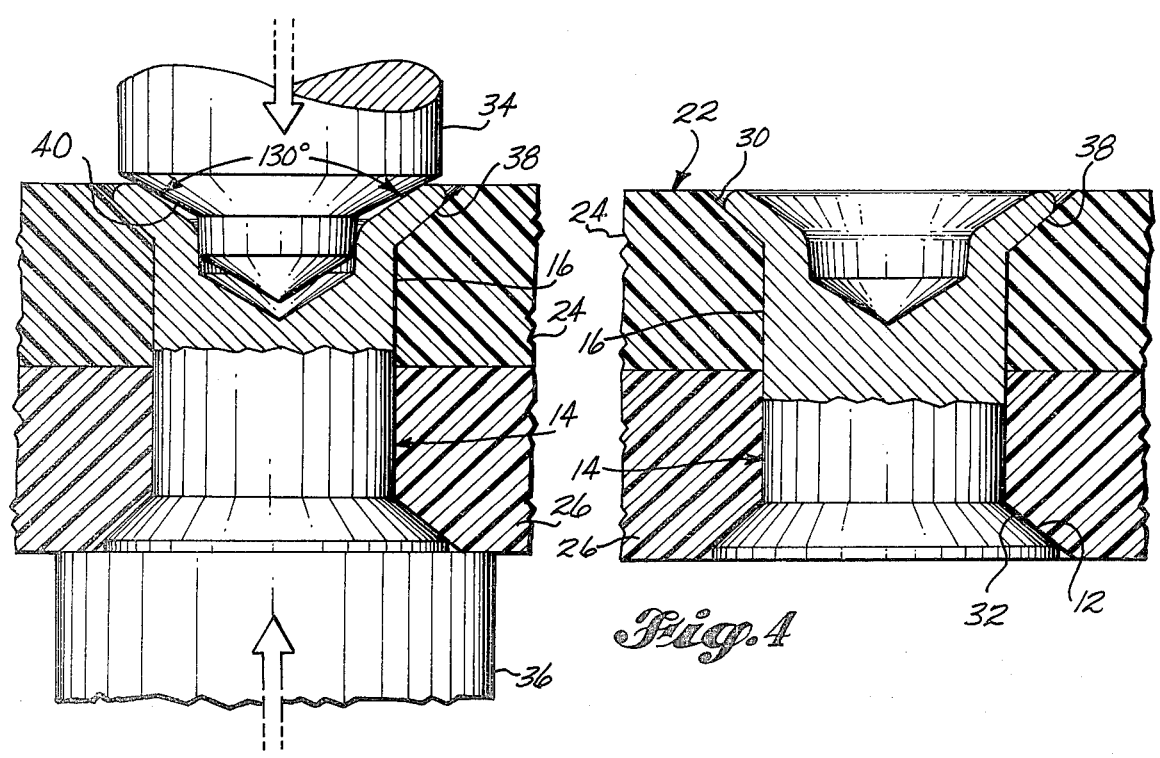

SEMI-TUBULAR RIVETS AND METHOD OF USING

BACKGROUND OF THE INVENTION

Assembly of fiber reinforced plastic laminates is accomplished by adhesive bonding or by joining with fasteners. In installations where fasteners are required and weight savings are a consideration it would be desirable to join the laminates with rivets instead of threaded fasteners, however, rivets create a problem as expansion of the rivet during the forming operation causes the laminate to be weakened as is evidenced by crazing in the area of the matrix around the formed rivet.

In U.S. Pat. No. 4,022,310 to Gennes a rivet tubular throughout the length of the shank is shown in combination with an adhesive for joining clutch friction discs.

In U.S. Pat. No. 1,591,478 to Eaton a rivet tubular throughout part of the length of the shank is used to join and compress a dust guard of fiber board or leatherboard covering a compressible absorbent body portion.

It was found that a special shaped semi-tubular rivet can be used to fasten together fiber reinforced plastic laminates without creating a weakness in the laminates.

SUMMARY OF THE INVENTION

A rivet of titanium columbium alloy is tubular for a distance in from the end away from the head, and the inside wall of the tubular section is tapered outwardly at an angle of about 15 degrees.

It is an object of this invention to provide a rivet for joining plastic laminates without the main shank of the rivet expanding against the bore of the laminate.

DESCRIPTION OF THE DRAWINGS

FIG. 1 shows an exploded side elevational partially sectional view of the rivet of this invention in combination with a fragmented sectional part to be joined.

FIG. 2 shows the rivet and part of FIG. 1 with the rivet inserted and ready to be formed.

FIG. 3 shows the rivet being formed with forming dies.

FIG. 4 shows the rivet joined part.

DETAILED DESCRIPTION

In rivet 10 the head 12 of the rivet is of the flush type and is at an angle of 100° to fit into a 100° countersink. The shank 14 is of a constant diameter and is open ended opposite the head to form a tubular end 16. The inside walls 18 of the tubular section are tapered outward at an angle of about 15° and terminate on a radius at 20. The rivets are used to join fiber reinforced laminates or fiber reinforced laminates to metals. It is imperative the rivet firmly hold the laminates without having the main part of the shank of the rivet expand during the forming process as the expanding shank sets up cracks in the laminate which causes structural failure. These rivets are made of an alloy of titanium and columbium to be compatible with laminates using graphite fibers as the reinforcement, but are not restricted to such use as the rivets are also used to join laminates of other materials. The alloy is preferably about 55% titanium and about 45% columbium. Straight walled tubular rivets and tubular rivets with inside walls tapered at 30° were completely unsatisfactory. Aluminum rivets may not be used to join laminates containing graphite as aluminum reacts chemically with the graphite.

In the figures an airplane elevator 22 is shown which is made up of a pair of laminates 24 and 26 joined with titanium columbium rivets 14. The laminates are of graphite fibers in an epoxy resin, are drilled through with bore 28 and are countersunk to 100° at each side at 30 and 32.

When joining the laminates the rivet is selected of a diameter to provide a net to a clearance fit into the bore, the rivet inserted and forming dies 34 and 36 located in a riveting machine not shown, are advanced to form a button 38 on tubular end 16 with the button pressing against the countersink 30. In forming the button the forming die uses contacting surface 40 that is at an angle of about 130° instead of a conventional angle for a die; which would be at about the same angle as the countersink. Preferably the depth of the tubular section of the shank is greater than the depth of the countersink against which the button is formed.

These figures show a flush head rivet, however it is not intended to limit the rivet to a flush head as other types of manufactured heads may be used as long as the opposite end of the rivet is tubular as shown.

We claim:

1. A rivet comprising: a titanium columbium alloy, a head, a shank sized to give a net to a clearance fit in a plastic part to be joined and having a concentric opening extending part way inward to form a tubular end to the shank, and the inside wall of the tubular end tapers outward at an angle of about 15 degrees to permit a button to be formed on the tubular end without expanding the shank of the rivet.

2. A rivet as in claim 1 wherein the rivet comprises about 55% titanium and about 45% columbium.

3. A rivet, that when formed joins laminates containing reinforced plastic with a double flush head and without the rivet expanding against the bore of the reinforced plastic, the rivet comprises: an alloy of about 55% titanium and about 45% columbium, a manufactured flush head, a constant diameter shank having an open end with tubular walls along part of its length, and the inside wall tapers outward at an angle of about 15 degrees to permit the end of the shank to be deformed outward to fill a countersink area without exerting outward pressure throughout the balance of the shank.

4. A method of joining parts at least one of which is a fiber reinforced plastic laminate, the steps comprising: drilling a hole through parts to be joined and countersinking on at least one side, selecting a semi-tubular rivet of titanium columbium alloy having a head and having an inside wall on the tubular portion that tapers outwardly at about 15 degrees, inserting the rivet with a net to a clearance fit in the hole in the parts, insuring that the open end of the tubular rivet is on the countersink side, placing a die on the open end with said die tapered at an angle greater than the angle of the countersink, and squeezing the rivet at a pressure sufficient to set the rivet by forming the open end of the rivet against the countersink.

5. A method of joining parts as in claim 4 further comprising: cutting the countersink at an angle of 100°, and using an angle of about 130° on the rivet forming die.

* * * * *